US012694602B2

(12) United States Patent
Paul et al.

(10) Patent No.: US 12,694,602 B2
(45) Date of Patent: Jul. 28, 2026

(54) THREE-DIMENSIONAL CLUSTER SIMULATION ON GPU-LESS SYSTEMS

(71) Applicant: TEXAS INSTRUMENTS INCORPORATED, Dallas, TX (US)

(72) Inventors: Subhajit Paul, Bangalore (IN); Nikhil Nandkishor Devshatwar, Bangalore (IN); Santhana Bharathi N, Tamil (IN); Shravan Karthik, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 344 days.

(21) Appl. No.: 18/309,213

(22) Filed: Apr. 28, 2023

(65) Prior Publication Data

US 2023/0256826 A1 Aug. 17, 2023

Related U.S. Application Data

(63) Continuation of application No. 17/235,251, filed on Apr. 20, 2021, now Pat. No. 11,673,469, which is a
(Continued)

(30) Foreign Application Priority Data

Aug. 30, 2017 (IN) .............................. 201741030716

(51) Int. Cl.
*G06T 15/00* (2011.01)
*B60K 35/21* (2024.01)
(Continued)

(52) U.S. Cl.
CPC .......... *G06T 15/005* (2013.01); *B60K 35/211* (2024.01); *B60K 35/22* (2024.01);
(Continued)

(58) Field of Classification Search
CPC ................... B60K 37/02; B60K 35/00; B60K 2370/1531; B60K 2370/152;
(Continued)

(56) References Cited

U.S. PATENT DOCUMENTS 9,064,322 B1 * 6/2015 Wyatt ................... G06F 3/1438
9,135,754 B2 * 9/2015 Ng-Thow-Hing ... G01C 21/365
(Continued)

FOREIGN PATENT DOCUMENTS

EP 3113169 A1 * 1/2017 ............. G09G 5/001

OTHER PUBLICATIONS

Mahajan et al ("The basics of automotive cluster device architectures and applications, part I", 2014) (Year: 2014).*
(Continued)

*Primary Examiner* — Xin Sheng
(74) *Attorney, Agent, or Firm* — Michelle F. Murray; Frank D. Cimino

(57) ABSTRACT

A method that simulates effects of displaying assets using a graphical processing unit (GPU) is provided. The method includes extracting preprocessed assets, the assets having been preprocessed offline to provide simulated GPU graphical effects, isolating dynamic assets from static assets from the preprocessed assets, calculating a bounding-box for each of the dynamic assets, alpha-blending the static assets, alpha-blending the dynamic assets, and rendering the static assets and the dynamic assets to separate display layers at different frequencies.

24 Claims, 10 Drawing Sheets

Related U.S. Application Data continuation of application No. 16/107,616, filed on Aug. 21, 2018, now abandoned.

(51) Int. Cl.

| | |
|---|---|
| *B60K 35/22* | (2024.01) |
| *B60K 35/50* | (2024.01) |
| *G06T 13/00* | (2011.01) |
| *G06T 15/50* | (2011.01) |
| *G06T 15/60* | (2006.01) |
| *G06T 15/80* | (2011.01) |
| *G06T 19/20* | (2011.01) |

(52) U.S. Cl.
CPC .............. *B60K 35/50* (2024.01); *G06T 13/00* (2013.01); *G06T 15/503* (2013.01); *G06T 19/20* (2013.01); *B60K 35/213* (2024.01); *G06T 15/506* (2013.01); *G06T 15/60* (2013.01); *G06T 15/80* (2013.01); *G06T 2210/12* (2013.01); *G06T 2219/2016* (2013.01)

(58) Field of Classification Search
CPC . B60K 2370/155; G06T 13/00; G06T 15/005; G06T 15/503; G06T 19/20; G06T 15/506; G06T 15/60; G06T 15/80; G06T 2210/12; G06T 2219/2016
See application file for complete search history.

(56) References Cited

U.S. PATENT DOCUMENTS

| | | | | |
|---|---|---|---|---|
| 9,282,294 | B2 | 3/2016 | Nefedov | |
| 10,325,343 | B1* | 6/2019 | Zhao | ................... H04L 67/1042 |
| 2006/0170693 | A1 | 8/2006 | Bethune | |
| 2006/0187235 | A1 | 8/2006 | Hamburg | |
| 2006/0284976 | A1* | 12/2006 | Girgensohn | .......... G06F 16/786 |
| | | | | 348/135 |
| 2010/0091025 | A1 | 4/2010 | Nugent | |
| 2010/0211794 | A1 | 8/2010 | Bilobrov | |
| 2011/0157195 | A1* | 6/2011 | Sprangle | ............... G06F 9/3877 |
| | | | | 345/522 |
| 2014/0292769 | A1* | 10/2014 | Sv | ............................ G06T 3/40 |
| | | | | 345/473 |
| 2014/0375641 | A1* | 12/2014 | Bakalash | .............. G06T 15/205 |
| | | | | 345/426 |
| 2015/0269772 | A1 | 9/2015 | Ha | |
| 2018/0033405 | A1* | 2/2018 | Tall | ........................... G06T 9/00 |
| 2018/0254065 | A1 | 9/2018 | Chen | |

OTHER PUBLICATIONS

Miura, Eisuke, Makoto Nakahara, and Hidefumi Nishi. "Graphics Display Controller for Automotive Applications." Fujitsu Sci. Tech. J 49.1 (2013): 23-28. (Year: 2013).*

Jgallant ("Auto calculating bounding box from texture in Monogame", 2014) (Year: 2014).*

Jgallant ("Auto calculating bounding box from texture in Monogame", 2014, http://www.jgallant.com/ auto-calculating-bounding-box-from-texture-in-monogame-xna/) (Year: 2014).

Mahajan et al ("The basics of automotive cluster device architectures and applications, part I", 2014, https://www.edn.com/design/automotive/4437780/4/The-basics-of-automotive-cluster-device-architectures-and-applications-part-I) (Year: 2014).

* cited by examiner

200

FAIL-SAFE SYSTEM

204

GPU CLUSTER SUBSYSTEM

| CPU/HLOS | ~206 | ↕ 214~ | INTERNAL MEMORY |
|---|---|---|---|
| | | ~250 | |
| DIGITAL SIGNAL PROCESSOR | ~208 | 216~ | DISPLAY CONTROLLER SUBSYSTEM |
| GPU | ~210 | 218~ | PERIPHERALS |
| CAN INTERFACE | ~212 | 220~ | EXTERNAL MEMORY CONTROLLER |

EXTERNAL MEMORY ~222

224

246

CAN 254

246

GPU-LESS FALLBACK CLUSTER SUBSYSTEM

| CPU/RTOS | | INTERNAL MEMORY |
|---|---|---|
| | ~226 | 232~ |
| DIGITAL SIGNAL PROCESSOR | | DISPLAY CONTROLLER SUBSYSTEM |
| | ~228 | 234~ |
| 252~ | | PERIPHERALS |
| | | 236~ |
| CAN INTERFACE | | EXTERNAL MEMORY CONTROLLER |
| | ~230 | 238~ |

QoS SWITCH

242

DISPLAY

244

248~ CPU/RTOS

EXTERNAL MEMORY ~240

FIG. 2

1000
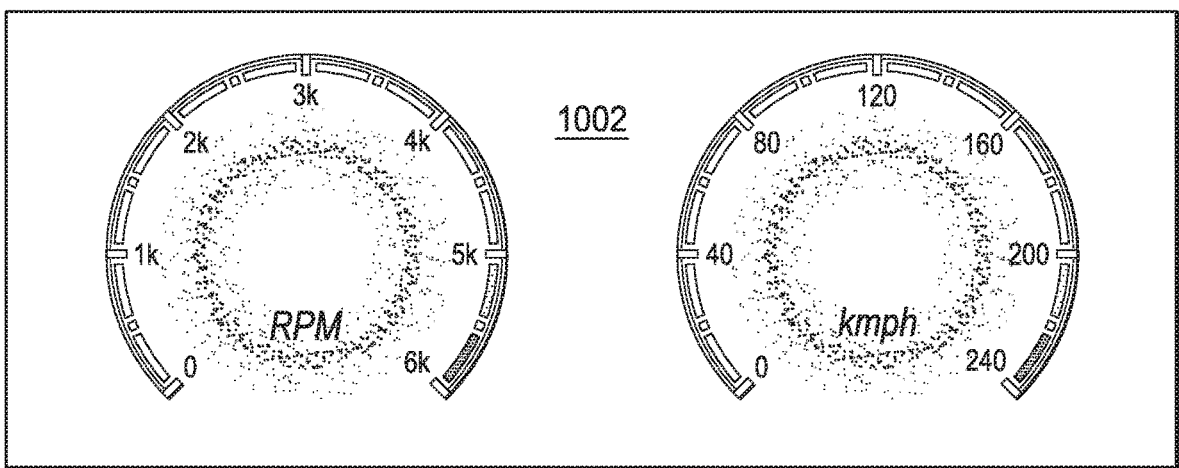
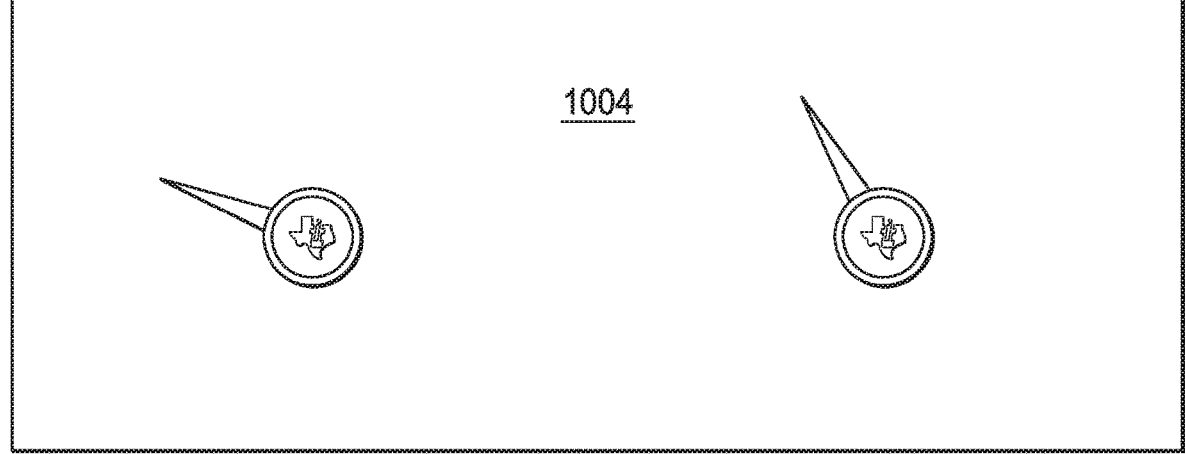
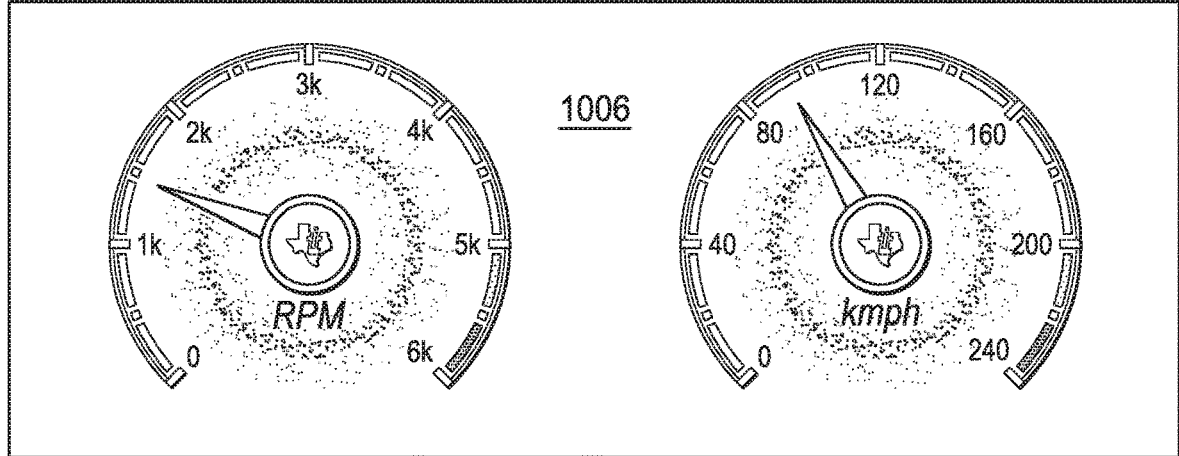
FIG. 10

THREE-DIMENSIONAL CLUSTER SIMULATION ON GPU-LESS SYSTEMS

RELATED APPLICATIONS

This application is a continuation of U.S. patent application Ser. No. 17/235,251, filed Apr. 20, 2021, which is a continuation of U.S. patent application Ser. No. 16/107,616, filed Aug. 21, 2018, which claims priority from Indian Application No. 201741030716, filed Aug. 30, 2017, all of which are incorporated herein by reference.

TECHNICAL FIELD

This relates to graphical rendering, and more particularly to a three-dimensional cluster simulation on GPU-less systems.

BACKGROUND

A three-dimensional (3D) cluster is a digital instrument cluster system that mimics an analog cluster. For an advanced driver assistance system, the cluster is responsible for rendering gauges, needles and tell-tale safety indicators on a liquid crystal display (LCD). 3D clusters are easily reconfigurable, typically employing a software update to change the visual experience. These clusters can provide enriched visual experience by adding lighting and shadow effects to effect realism. A 3D cluster renders rich graphical content by using a GPU and graphics libraries (like OpenGL) for driving the GPU. Cluster applications use assets having a 3D model of objects which describes the geometry and texture of individual entities (e.g., gauges and needles). An entire scene can be rendered by transforming assets through positioning, scaling or rotation. Specialized techniques such as shading are used to perform depth calculations and the depth information is used to render glow and shadows to create photorealistic 3D effects.

SUMMARY

This disclosure relates to a method and apparatus for simulating a cluster system that has a GPU using a cluster system that does not have a GPU.

In one example, a method that simulates effects of displaying assets similar to assets displayed when using a graphical processing unit (GPU)-based digital cluster subsystem is disclosed. The method includes extracting preprocessed assets, the assets having been preprocessed offline to provide simulated GPU graphical effects, isolating dynamic assets from static assets from the preprocessed assets, calculating a bounding-box for each of the dynamic assets, alpha-blending the static assets, alpha-blending the dynamic assets, and rendering the static assets and the dynamic assets to separate display layers at different frequencies.

In another example, an apparatus that simulates the effects of displaying assets using a GPU is provided. The apparatus includes a memory storing preprocessed assets, a processor configured to execute a variety of computer executable components that simulate 3D effects similar to that of a graphical processing unit (GPU) digital cluster subsystem, wherein the computer executable components include an extraction component configured to extract the preprocessed assets from the memory, an isolation component configured to isolate dynamic assets from static assets from the preprocessed assets, a bounding-box calculation component configured to calculate a bounding-box for each of the dynamic assets, an alpha-blending component configured to alpha-blend the static assets, and to alpha-blend the dynamic assets, and a rendering component configured to render the static assets and the dynamic assets to separate display layers at different frequencies.

In another example, a method is provided that switches between a GPU-based asset rendering system and a GPU-less asset rendering system. The method includes providing a set of assets for rendering to a display with a graphical processing unit (GPU), providing a modified version of the set of assets for rendering to the display with an auxiliary processor, the modified version of the set of assets being processed to provide assets that will be displayed with similar effects as those provided when the set of assets are displayed with the GPU, and switching between the displaying of the set of assets and the modified version of the set of assets based on an availability of the GPU.

BRIEF DESCRIPTION OF THE DRAWINGS

FIG. 2 is a block diagram showing the hardware components of an example fail-safe cluster system.

FIG. 10 depicts an example multi-frequency update of static and dynamic layers.

DETAILED DESCRIPTION

Figure 1:
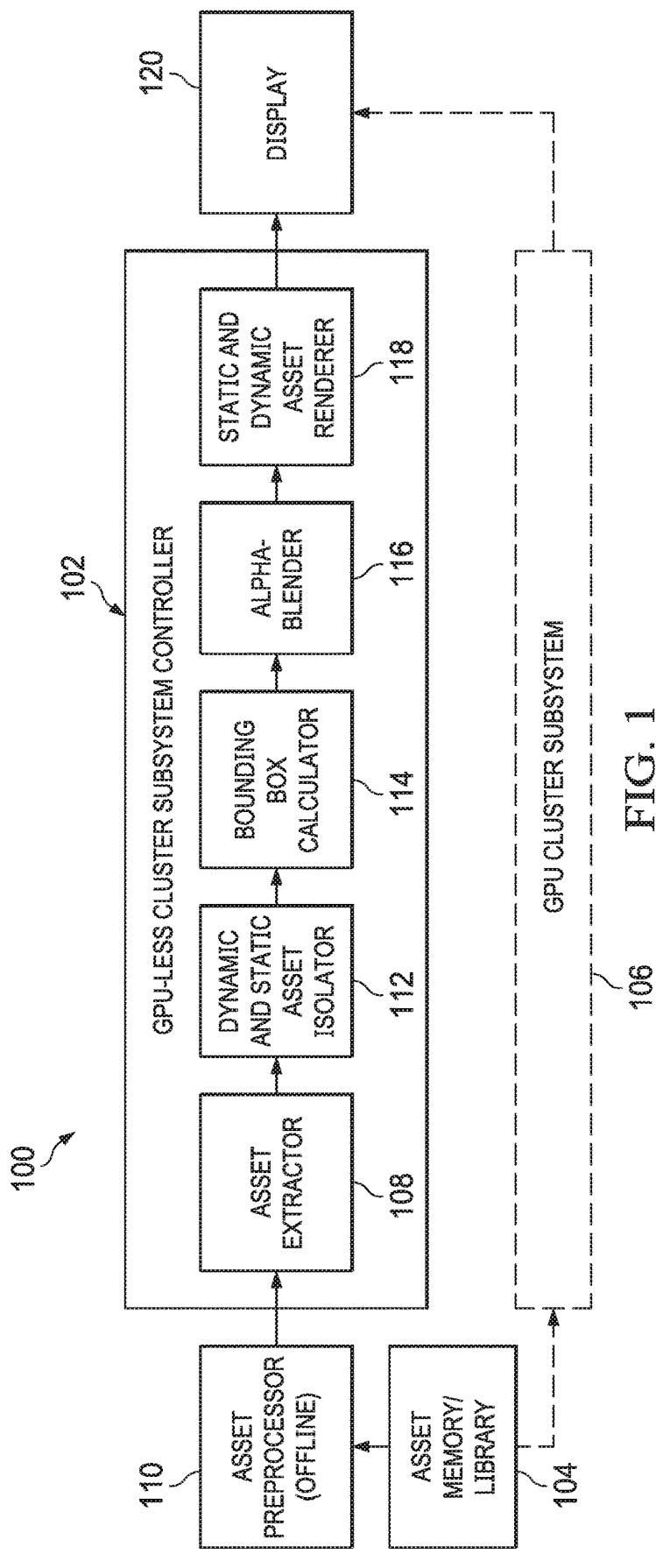
FIG. 1 is a block diagram of an example system 100 that implements a GPU-less cluster subsystem with a GPU-based cluster subsystem alternative.

A cluster is a system or subsystem comprising a number of different hardware and software components that implement an application and cooperate to gather data and then render that data onto a display. For example, a digital instrument cluster can be used to render data to a digital instrument panel for a vehicle, where the digital instrument panel includes information important to the driver such as speed, fuel level, and navigation information. Clusters that have a GPU are more powerful than clusters that do not have a GPU. This is because the GPU itself is capable of performing interesting and sophisticated graphical functions (e.g., three-dimensional (3D) rendering and 3D blending).

A digital instrument cluster is a standard automotive technology. A digital instrument cluster data rendering includes the speed, revolutions per minute (RPM), and other indicators and tell-tale signs. Some systems are analog-based instrument cluster systems, which include a gauge and multiple needles displaying different parameters. The trend has been to shift towards digital instrument clusters. As part of that, most designers want to have a screen, and on that screen graphics which provide a rich experience of different gauges and needles, allowing the display of vehicular parameters. Because these digital instrument clusters are executed by software, the digital instrument clusters are configurable in a way that it is possible to change the display, and to display many parameters.

Digital instrument clusters having and using a GPU is a powerful technology used within automotive vehicles. This is because GPU-based digital instrument clusters allow many use-cases to be satisfied, as they provide rich and interesting features such as shading, dynamic color changes (e.g., changing the speed dial to a red color if the vehicle is moving at a certain speed), and other interesting three-dimensional (3D) features. The described examples herein address the situation when a GPU is unavailable. Typically, when reverting to a GPU-less fallback cluster subsystem scenario when the GPU is no longer managed, or the state of the GPU is not available, the present disclosure provides for a digital display that has the look and feel of a cluster system having a GPU while using a GPU-less cluster system. A system on a chip (SoC) can be implemented that simultaneously executes a GPU-based cluster subsystem and a GPU-less cluster subsystem, such that the GPU-less cluster subsystem can be used as a fallback mechanism in case the GPU-based cluster subsystem has crashed or is otherwise unavailable.

Accordingly, when a GPU cluster subsystem has crashed, the high-level operating system executing the GPU has crashed, or resources needed to render the data generated by the GPU cluster subsystem are unavailable, a switch to a GPU-less fallback cluster subsystem can be achieved with minimal latency. While the amount of time is configurable, in one example the time between detection that the GPU cluster subsystem is down and completing the switch to the GPU-less cluster subsystem is about 32 milliseconds. Rendering at 60 frames per second (fps) is an industry standard, and 60 frames per second is approximately one frame per 16 milliseconds. If there is a drop of two frames (for approximately 32 milliseconds), then it can be that the GPU cluster subsystem has crashed, in which case it may be prudent to switch to the GPU-less cluster subsystem to render instrument data.

Digital instrument clusters are typically rendered by a GPU to achieve a pleasant user experience by mimicking analog clusters. GPU-less driven cluster systems may not be able to match the user experience provided by GPU-based cluster system applications. The present disclosure provides for a GPU-less cluster system or subsystem to simulate realism and match the visual satisfaction of a cluster system or subsystem with a GPU. GPU-based cluster systems typically execute on a main processor core driven by a high-level operating system (HLOS) such as Linux, Android, QNX, etc. Microcontroller-based systems (e.g., GPU-less cluster systems) are good for safe applications. However, microcontrollers are programmed to do one task, are not powerful, and are not built to provide rich graphical content and features like lighting and shading. Microcontroller based cluster systems do not render high quality graphical content and the user experience is dissimilar to that of a GPU-based cluster system.

The example disclosed herein extract assets from a GPU-based cluster system (or subsystem) and use them for a GPU-less cluster system (or subsystem). Furthermore, the examples disclosed herein uses a GPU-less cluster system to display data having a similar look-and-feel as data displayed by a GPU-based cluster system. Additionally, the examples disclosed herein provide that in the event of GPU unavailability/high-load, seamless switching between two cluster systems with a similar visual experience is possible (e.g., from a GPU-based cluster system to a GPU-less cluster system, and vice versa). To simulate 3D effects similar to that of a GPU cluster system, the examples disclosed herein initially preprocess assets images with filters to achieve the visual effects with a display subsystem (DSS) using alpha-blending techniques. This results in achieving 3D like effects (like shadows and glowing objects) by alpha-blending in a similar way that a Porter-duff blending can be performed on a GPU cluster system. Also, the examples disclosed herein identify dynamic assets by calculating inter-frame pixel differences. As a result, minimal overdraw can be achieved by rendering dynamic assets in a different layer and blending the static and dynamic layers. Furthermore, in the examples disclosed herein, static and dynamic assets are rendered on separate buffers. This facilitates efficient use of memory bandwidth using a system that can be run on an auxiliary core processor running at a reduced clock rate. Moreover, the examples disclosed herein implement a dynamic bounding box calculation for each transformation of dynamic assets. Bounding-box computations result in reduced asset size, and direct memory access operations for rendering assets with sparse content.

FIG. 1 is a block diagram of an example system 100 that implements a GPU-less cluster subsystem with a GPU-based cluster subsystem alternative. The GPU-less cluster subsystem controller 102 is generally a fallback mechanism, because if the GPU-based cluster subsystem 106 is available or has a manageable load, then the GPU-based cluster subsystem 106 is used to display the application data on the display 120. The GPU-less cluster subsystem controller 102 is responsible for executing components that implement the rendering of data similar to that of the GPU-based cluster subsystem 106. In particular, as shown in FIG. 1, an asset extractor 108 extracts 3D assets from an asset memory or library 104. Most 3D applications and graphics applications are rendered offline on PCs or devices with significant computing power. There, the cluster is rendered and where the design and look and feel of the cluster is created (the design of the needles, etc.). Based on these assets, and the design of the cluster assets, the assets are captured in the asset extraction phase. That is, assets that the GPU renders is stored. Asset extraction by the asset extractor 108 is similar of taking a screenshot of assets as they are rendered by the GPU.

Extraction of assets by the asset extractor 108 involves simulation of inputs by a GPU cluster subsystem to force rendering the assets in the different variations. The assets are extracted from pre-rendered content. For example, for a car dashboard application, the assets would be the needle angles. Then, for each input to the GPU-less cluster subsystem, a corresponding asset is used from the pre-rendered GPU cluster subsystem An offline asset preprocessor 110 determines a GPU-like blending of the assets. After a screenshot of an asset is taken, a filter and process is applied so the asset looks different so that when the asset is rendered onto the display, it can look like it is not actually a screenshot capture. The offline asset preprocessor uses alpha and color channels to alter the assets. These assets, when later alpha-blended by the GPU-less cluster subsystem, produce images similar to images produced by a 3D cluster system rendered by a GPU. The preprocessing of extracted assets produces images similar to images that would be an output of a Porter-duff blending by altering alpha and color channels in the extracted assets. Extracting preprocessed assets is then performed.

A dynamic and static asset isolator 112 isolates dynamic assets from static assets by calculating inter-frame per-pixel differences. Static assets like dials and menus do not change position or transform between frames. Dynamic assets like needles, speed indicators and tell-tales rapidly change between frames. If normally static assets like dials change, they change at a much lower rate than the rate at which the dynamic assets like needles change. Accordingly, static assets are isolated from dynamic assets by calculating the difference between successive frames (pre-rendered from simulated 3-D cluster) on a specific region-of-interest to identify dynamic asset transformations. When a screenshot is taken, the static and dynamic assets (e.g., dials and needles) are captured together. The way to just extract the dynamic (needle) asset is by calculating the inter-frame pixel differences.

A bounding box calculator 114 calculates a bounding-box for the dynamic assets. A bounding-box is calculated for dynamic assets for each transformation. The bounding-box for dynamic assets is different for each transformation. Asset size is reduced based on the bounding box for each asset transformation, such that varying asset size results in optimum copy operations for the GPU-less cluster subsystem. The GPU-less cluster subsystem copies the transformed assets to the output frame.

After calculation of the bounding-box, an alpha-blender 116 alpha-blends the preprocessed assets. Then, a static and dynamic asset renderer 118 renders static and dynamic contents to separate layers at different frequencies. During this process, data can be rendered to a display 120, where static assets are copied to a separate layer which can be updated and rendered at a first frequency. Dynamic assets are copied to a different layer which is double-buffered and updated each frame (in other words, the dynamic assets are rendered at a second frequency, wherein the second frequency is greater than the first frequency). The layers are displayed using different DSS pipelines. To facilitate safety, there is an industry standard in the automotive industry that data has to be rendered at 60 frames per second. By isolating the static and dynamic layers, the system facilitates that the cluster (and the needle especially) is able to be rendered at 60 frames per second without bottling the bandwidth of the system.

The system 100 can be executed by and implemented ono a main chip, such as a system on a chip (SoC). Utilizing the main chip for disparate applications (e.g., digital driving display, navigation, infotainment, rear seat entertainment) can consume significant GPU resources. If it is desired to use the main chip to implement a cluster system application as well, such as a digital instrument panel, but a GPU is not available because it is completely occupied dedicating its resources to something else, a GPU-like cluster could still be rendered on the digital instrument panel driving display. A chip can service multiple tasks at a time, including tasks required to implement the digital instrument cluster system. The chip is responsible for reading and assembling various vehicular parameters, such as the speed of the car, engine temperature, and to display these parameters. In an ideal implementation of the disclosed method and system, a user may not be able to tell the difference between a GPU-based cluster subsystem rendering of the instrument panel and a GPU-less cluster subsystem rendering of the instrument panel.

FIG. 2 is a block diagram showing the hardware components of an example fail-safe system 200, including the components and data flow of a GPU cluster subsystem 204 and a GPU-less fallback cluster subsystem 224. The fail-safe system 200 can be implemented on a system on a chip (SoC), such that the GPU cluster subsystem 204 and the GPU-less fallback cluster subsystem 224 are implemented on the same SoC. Whereas in other examples, the GPU cluster subsystem 204 and the GPU-less fallback cluster subsystem 224 are implemented on different SoCs. In some examples, the GPU cluster subsystem 204 and the GPU-less cluster subsystem are digital cluster subsystems.

The GPU cluster subsystem 204 subsystem includes a high-level central processing unit (CPU) 206 that executes a high-level operating system (HLOS), digital signal processor (DSP) 208, graphics processing unit (GPU) 210, CAN interface 212, internal memory 214, display controller subsystem 216, peripherals 218 and external memory controller 220. In this example, these parts are bidirectionally connected to a system bus 250. General purpose CPU 206 typically executes what is called control code. DSP 208 typically operates to process images and real-time data. These processes are typically referred to as filtering. Processes such as geometric correction are performed by DSP 208. GPU 210 performs image synthesis and display oriented operations used for manipulation of the data to be displayed. CAN interface 212 interfaces with the CAN 254. Attached to the CAN 254 are various sensors 246 that obtain external information (in the case of a car application, information about engine temperature, speed, etc.). Internal memory 214 stores data used by other units and may be used to pass data between units. Internal memory 214 may be a video dynamic random access memory (VDRAM). The existence of internal memory 214 on the GPU cluster subsystem 204 does not preclude the possibility that general purpose CPU 206, DSP 208 and GPU 210 may include instruction and data cache. Display controller subsystem 216 sends data buffers to the QoS switch 242 which is controlled by a monitoring software. The QoS switch 242 decides whether to post data buffers onto the display 244 from the GPU cluster subsystem 204 or the GPU-less fallback cluster subsystem 224. Thus, the QoS switch 242 is configured to switch to the GPU cluster subsystem 204 or to continue to utilize the GPU cluster subsystem 204 when a GPU is available, and to switch to the GPU-less fallback cluster subsystem 224 or to continue to utilize the GPU-less fallback cluster subsystem 224 when a GPU is unavailable. Peripherals 218 may include various parts such as a direct memory access controller, power control logic, programmable timers and external communication ports for exchange of data with external systems (as illustrated schematically in FIG. 2). External memory controller 220 controls data movement into and out of external memory 222.

The GPU-less fallback cluster subsystem 224 is configured similarly, except that it does not have a GPU and its CPU 226 executes on the RTOS. The components except the GPU cluster subsystem 204 execute on another auxiliary core processor 248 and the RTOS. Like the GPU cluster subsystem 204, the GPU-less fallback cluster subsystem 224 includes a DSP 228, CAN interface 230, internal memory 232, display controller subsystem 234, peripherals 236, external memory controller 238 to interface with external memory 240, and system bus 252.

Figure 3:
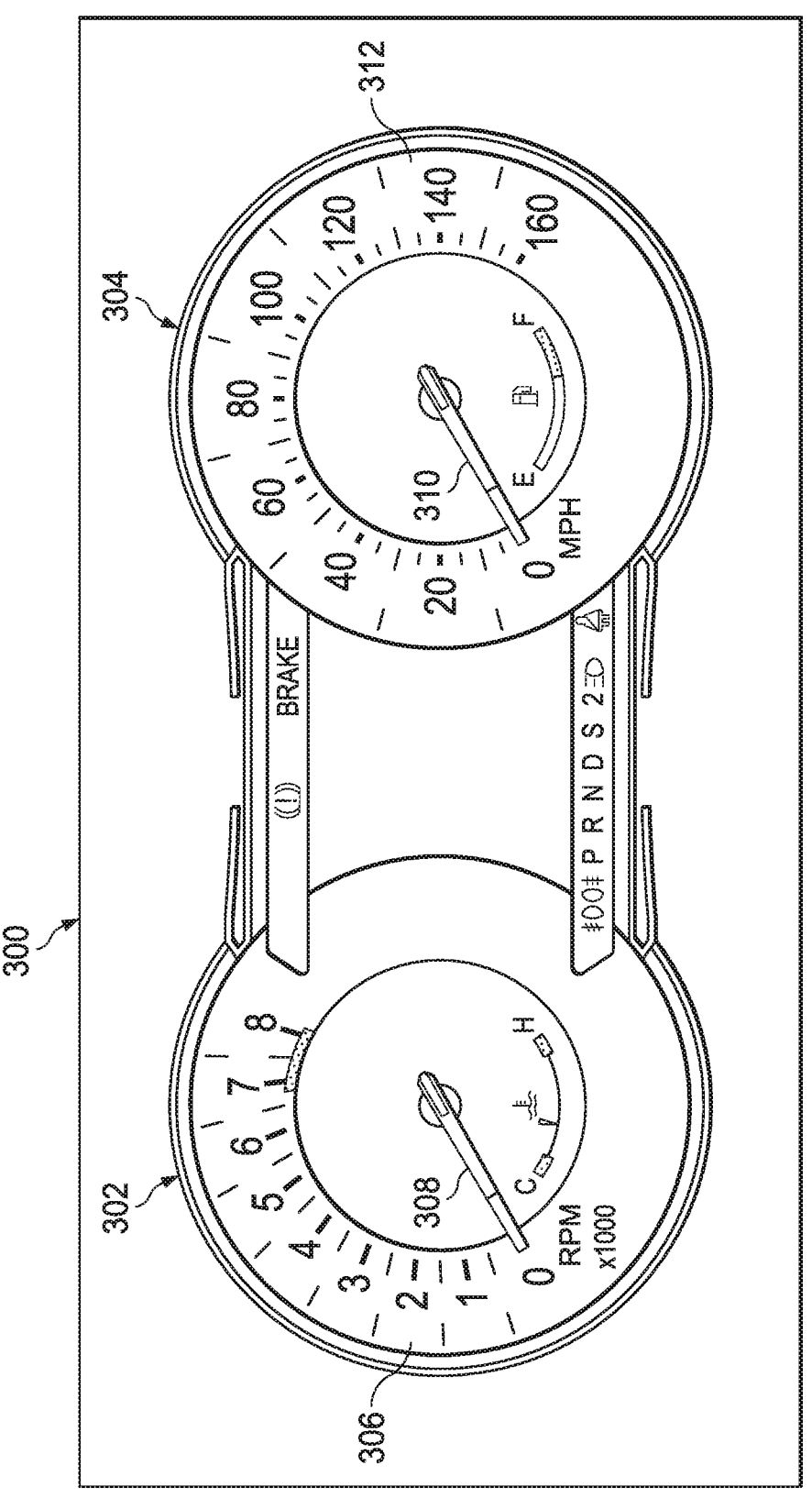
FIG. 3 shows a car dashboard application being implemented by an example 3D digital instrument cluster system.

FIG. 3 shows a car dashboard application 300 being implemented by an example 3D digital instrument cluster system. Shown by this car dashboard application 300 is the RPM 302 and speed 304, including the dial 306, 312 and needle 308, 310 assets. A GPU-like rendering of the car dashboard application 300 is performed by first extracting assets. That is, for each possible asset position (e.g., needle position), assets are extracted from a memory. As an example of an asset, assume that there is a speedometer dial that spans from 0 to 160 mph, as is shown in FIG. 3. At a particular interval, the various positions that the assets (e.g., the needle) can take are captured and stored. After the assets are stored, several techniques available on system on a chip (SoC) hardware are used to preprocess the assets, including blending the assets to achieve effects such as lighting and shadow effects. The SoC hardware is a chip that has certain functionalities. By taking advantage of these functionalities it is possible to develop and render interesting features (like lighting and shadow effects). The disclosed examples are implemented by cluster subsystems that either do not have a GPU, or cluster subsystems having an operating system that does not have control of the GPU. An SoC is one chip solution that embeds into itself multiple functionalities. Given a processing core, interfaces are needed in order for the SoC to connect to memory such as VDRAM. By contrast, a laptop or computer uses a motherboard. An SoC houses the functionality inside of one chip, including the GPU processing power, the CPU processing power, as well as the RAM interfacing. The price of the SoC depends on its functionality. The price of an SoC with a GPU can be higher than the price of an SoC without a GPU. The examples disclosed herein provide a GPU-like feel for a cluster application when the SoC does not have a GPU. The examples disclosed herein can be extended to an SoC, and in particular, to 1) SoCs that do not have a GPU, and 2) SoCs in which the software does not have control of the GPU. Alternatively, the examples disclosed herein can be extended to SoCs that implement both a GPU-less cluster subsystem and a GPU cluster subsystem.

Figure 4:
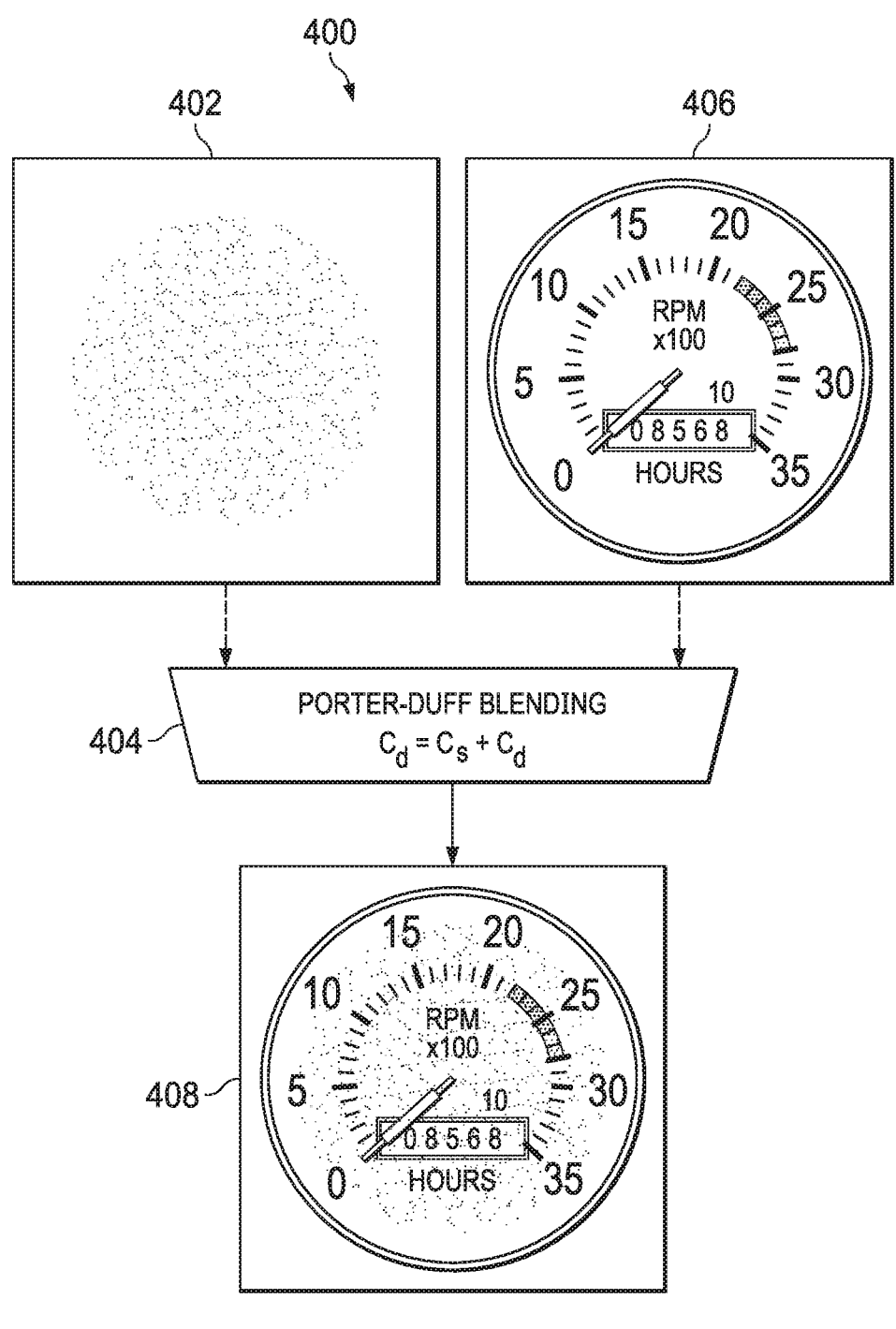
FIG. 4 depicts an example porter-duff blending of original assets.

FIG. 4 depicts an example Porter-duff blending of original assets 400, as would be done by a cluster system with a GPU. FIG. 4 illustrates the benefits of preprocessing the assets after extraction. Porter-duff blending (done by a GPU) is a blending of two images to achieve a look and feel that the blending is not an alpha matching and is more than an alpha matching. In FIG. 4, there is a light image 402, or a source of light which is an asset representing a glow highlight. The image on the right 406 is the captured screenshot from the asset extraction phase and is an asset representing a cluster element. Light image 402 and image 406 are Porter-duff blended 404 to produce a Porter-duff blended image 408, which is the preprocessed asset. A typical Porter-duff blending function is $C_d = C_s + C_d$, where $C_d$ is a destination image and $C_s$ is a source image. Porter-duff blending is an additive blending feature that writes over the destination image $C_d$ with a source image $C_s$ to produce another destination image $C_d$. Porter-duff blending is writing over the actual image.

As mentioned, Porter-duff blending is a process executed by a GPU. For example, if it is desired to illuminate the center of an image with a blue color, the GPU can do this operation and create such an image. The goal of the disclosed examples is for a GPU-less cluster system to achieve a similar effect as a Porter-duff blending. To actually achieve a similar effect, though the GPU-less cluster system does not have the Porter-duff blending hardware feature, the GPU-less cluster system has a less advanced hardware and software component which implements alpha-blending. The GPU-less cluster system uses the alpha-blending hardware to achieve interesting effects. Therefore, the alpha blending helps to simulate effects on a GPU-less cluster system (or subsystem) that would normally be available on a GPU-based cluster system (or subsystem).

In order to generate a set of assets as if done by a Porter-duff blending method on a GPU-based cluster system, the assets are preprocessed using a generalized blending function. The generalized blend function can be represented as $C_d = f(C_s, \alpha_s, C_d)$, where $C_s$ is a source color component and has values ranging between 0.0 and 1.0, $\alpha_s$ is a source alpha component and has values ranging between 0.0 and 1.0, and $C_d$ is a destination color component and has values ranging between 0.0 and 1.0. A per-pixel alpha blending function is $C_d = C_s \alpha_s + C_d (1 - \alpha_s)$, where determining a GPU-like blending generates assets with $C_s'$ and $\alpha_s'$ such that $f(C_s, \alpha_s, C_d) = C_s' \alpha_s' + C_d (1 - \alpha_s')$, and where when fixing $\alpha_s' = 0.5$ for each pixel in a preprocessed image results in $C_s' = \min(2 (f(C_s, \alpha_s, C_d) - 0.5 C_d), 1.0)$.

The preprocessing of the assets does not occur at runtime. Rather, the preprocessing of assets occurs in a simulated environment offline. The preprocessing occurs before the system boots. Given the assets (e.g., needles rotated at various angles), the system can use the preprocessed assets to render a display on the screen while the GPU-less cluster system is running. The output of the preprocessed assets are taken and executed on a target SoC. The assets are preprocessed offline, and then are taken and loaded into the firmware, such that when the firmware boots up, there can be a seamless switch between the GPU-based cluster system and the GPU-less cluster system.

Figures 5, 9:
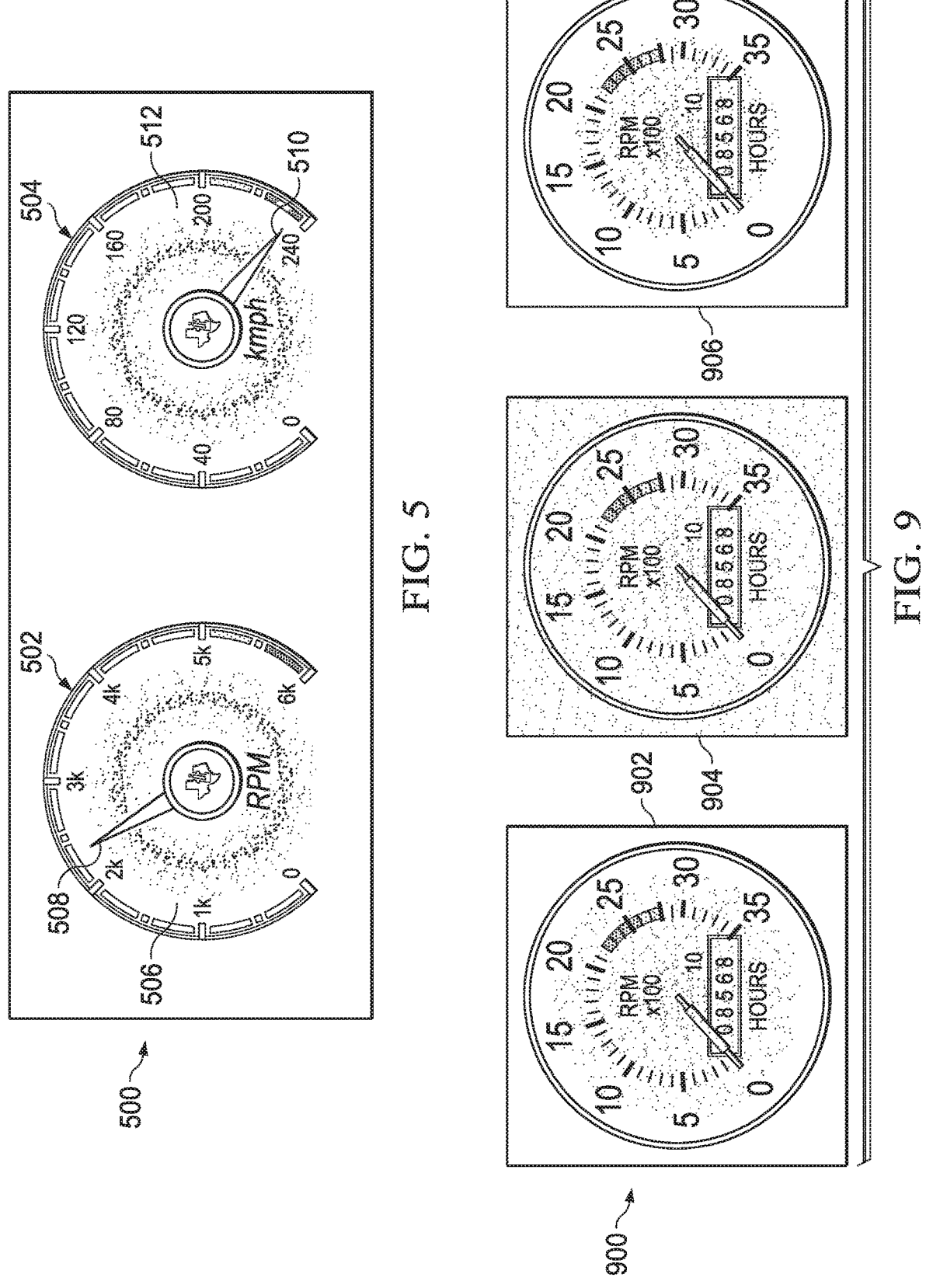
FIG. 5 depicts a car dashboard display rendered by a GPU-less cluster system.
FIG. 9 illustrates the results of different blend operations.

FIG. 5 depicts a car dashboard display rendered by a GPU-less cluster system 500. Dynamic assets are identified for this display inside a particular region-of-interest. Different iterations with varying regions of interest are used for isolating the dynamic assets. FIG. 5 shows two screenshots 502, 504 taken during the asset extraction phase. To just extract the needles 508, 510, the system examines the difference between one frame and the next frame. The pixels that have changed are the ones that belong to the needles 508, 510. In that sense, the system is able to isolate what exactly is the needles 508, 510, from the rest of the image which is most likely the static layer with just the dial 506, 512.

Figures 6A, 6B, 6C, 6D:
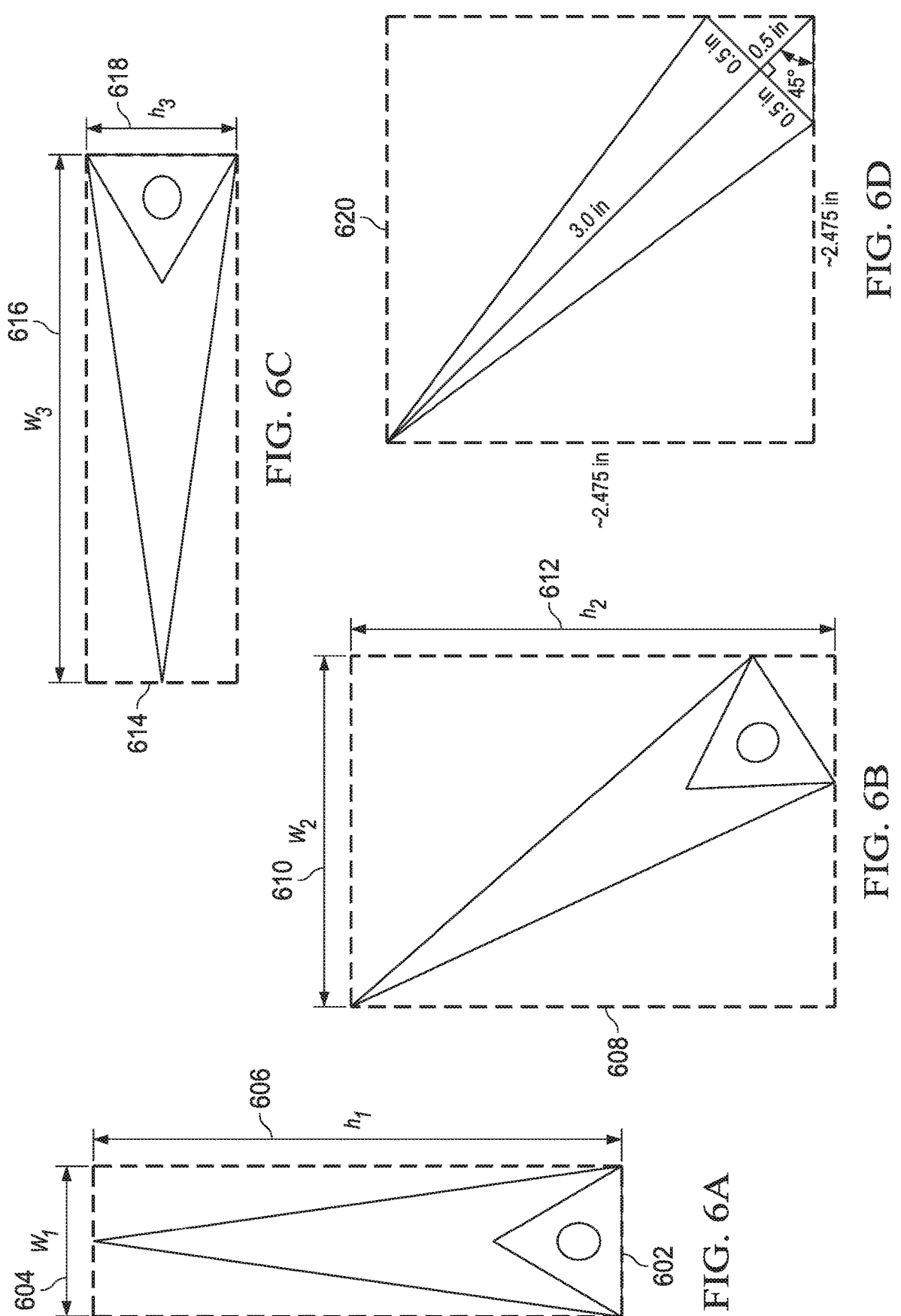
FIG. 6A depicts a dynamic bounding-box calculation when a needle is vertical.
FIG. 6B depicts a dynamic bounding-box calculation when a needle is at an angle.
FIG. 6C depicts a dynamic bounding-box calculation when a needle is horizontal.
FIG. 6D depicts a dynamic bounding-box calculation when a needle is at a 45° angle.

FIGS. 6A-D together depict an example of different stages of a bounding-box calculation. FIG. 6A depicts a dynamic bounding-box calculation when a needle is vertical. FIG. 6B depicts a dynamic bounding-box calculation when a needle is at an angle. FIG. 6C depicts a dynamic bounding-box calculation when a needle is horizontal. FIG. 6D depicts a dynamic bounding-box calculation when a needle is at a 45° angle.

A bounding-box is used because of the way the images are rendered (e.g., by taking an image of the dial and impose on top of the dial a picture of a needle). The picture of the needle can be such that whatever extra white space that is not the needle that resides in the box (602, 608, 614, 620) can be transparent. The reason the bounding-box is dynamically computed is so that space is saved. The needles can fit into a box the size of $w_3$ 616\*$h_1$ 606 (though $w_2$ 610\*$h_2$ 612 with the asset at a 45-degree angle is the biggest sized box that is ever used). However using a box the size of $w_3$ 616\*$h_1$ 606 can consume much more space. Without the varying bounding-box, each asset size would be equal to the largest possible bounding-box, or the size of $w_3$ 616 times $h_1$ 606. This is poor space management. The size of the assets are much smaller with a variable bounding box calculation. Accordingly, for a given position of the needle, the bounding-box calculation determines the least bounding-box that is needed to enclose the needle position. Note that, the extra amount of time used to compute the variable sized bounding-boxes is marginal compared to the amount of space saved by dynamically calculating the bounding-boxes.

After the needle is extracted, if it is upright (box 602) it can fit in a box of height $h_1$ 606 and width $w_1$ 604. This is the needle asset with no transformation (box 602). If the needle asset is diagonally placed 608 with a 45-degree rotation, then the asset has a bounding-box with width $w_2$ 610 greater than $w_1$ 604, but where the asset height is $h_2$ 612 is less than $h_1$ 606. Still, this bounding-box is much larger, because it is equal to $(h_1+0.5\ w_1)^2/2 > h_1*w_1$. The needle asset with a 90-degree rotation (box 614) has an asset with of $w_3$ 616, which is greater than $w_2$ 610 which is greater than $w_1$ 604, and an asset height of $h_3$ 618, which is less than $h_2$ 612 which is less than $h_1$ 606.

Consider an example 620, where $w_1$=1.0 in and $h_1$=3.0 in. Then $w_3$=3.0 in and $h_3$=1.0 in. In this case, if the needle is rotated 45 degrees as in FIG. 6D, trigonometry and geometry yields that $w_2$=$h_2$=3.5 in*sin (45°), or sqrt(6.125 in), or approximately 2.475 in, as shown by item 620. $w_2*h_2$ is precisely 6.125 in² (which is also equal to $(h_1+0.5\ w_1)^2/2$ in², or $3.5^2/2$ in² as indicated above). Thus the sum of the 3 bounding boxes is 3.0 in²+3.0 in²+6.125 in²=12.125 in², or 14.875 in² less than 3 bounding boxes of 9 in² each or 27 in². In this case, a dynamic bounding-box computation reduces the amount of data that is transferred significantly.

Figure 7:
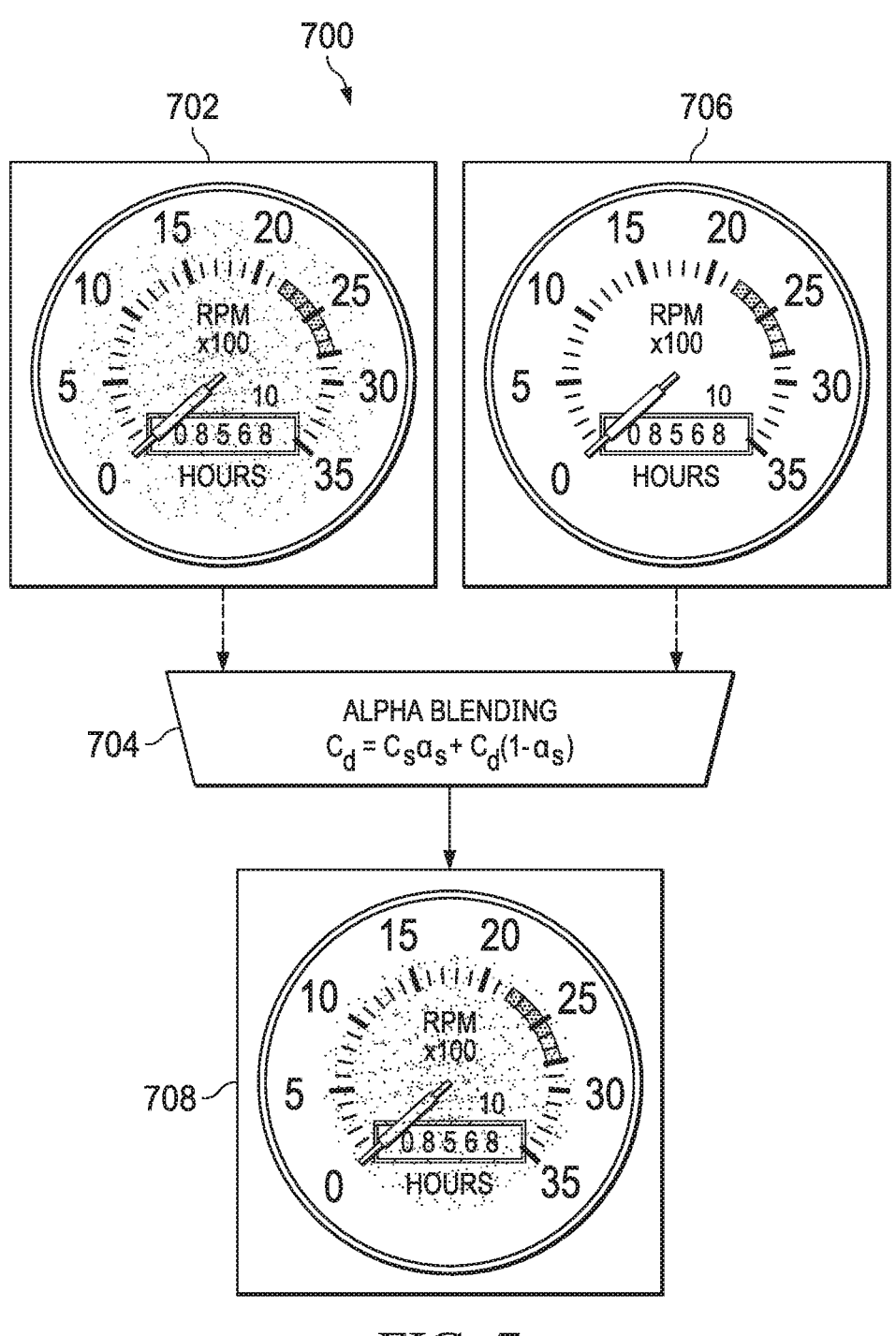
FIG. 7 depicts alpha blending of pre-processed assets.

FIG. 7 depicts alpha-blending of assets 700 after the assets have been preprocessed. Item 702 is a preprocessed source image, or a preprocessed asset. Item 702 is the result of the GPU-like Porter-duff blending 408 from FIG. 4, and as such, is a preprocessed asset representing a glow highlight. A typical alpha-blending function 704 is $C_d=C_s\alpha_s+C_d$ $(1-\alpha_s)$, where $C_d$ is a destination color component, $C_s$ is a source color component, and as is a source alpha component. A typical value for alpha is 0.5. Item 706 is the destination image, or an asset representing a cluster element. Item 708 is the result of the alpha blending. Alpha-blending is performed by performing a Boolean operation of an asset source image with a destination image, and produces effects including glow, lighting, shading, and shadow.

Typically, the GPU blending module is customizable and programmable. So the GPU can be given a source buffer, a destination buffer, and a mathematical function, and the blending output can be a function of a source and a destination. A variety of Boolean operations (e.g., addition or multiplication) are available for the Porter-duff blending between a source and a destination (e.g., an output color can be achieved).

In contrast, the GPU-less cluster system does not use a programmable blender. The GPU-less cluster system has a blender where the blending operation is a fixed function given by a second equation, or $C_d=C_s\alpha_s+C_d(1-\alpha_s)$, such as that provided by the alpha-blending function 704. The GPU-less cluster system's job is to take the source image, and preprocess them in a way such that when you use the alpha blending function, it appears similar to a Porter-duff blended function.

Figures 8A, 8B, 8C:
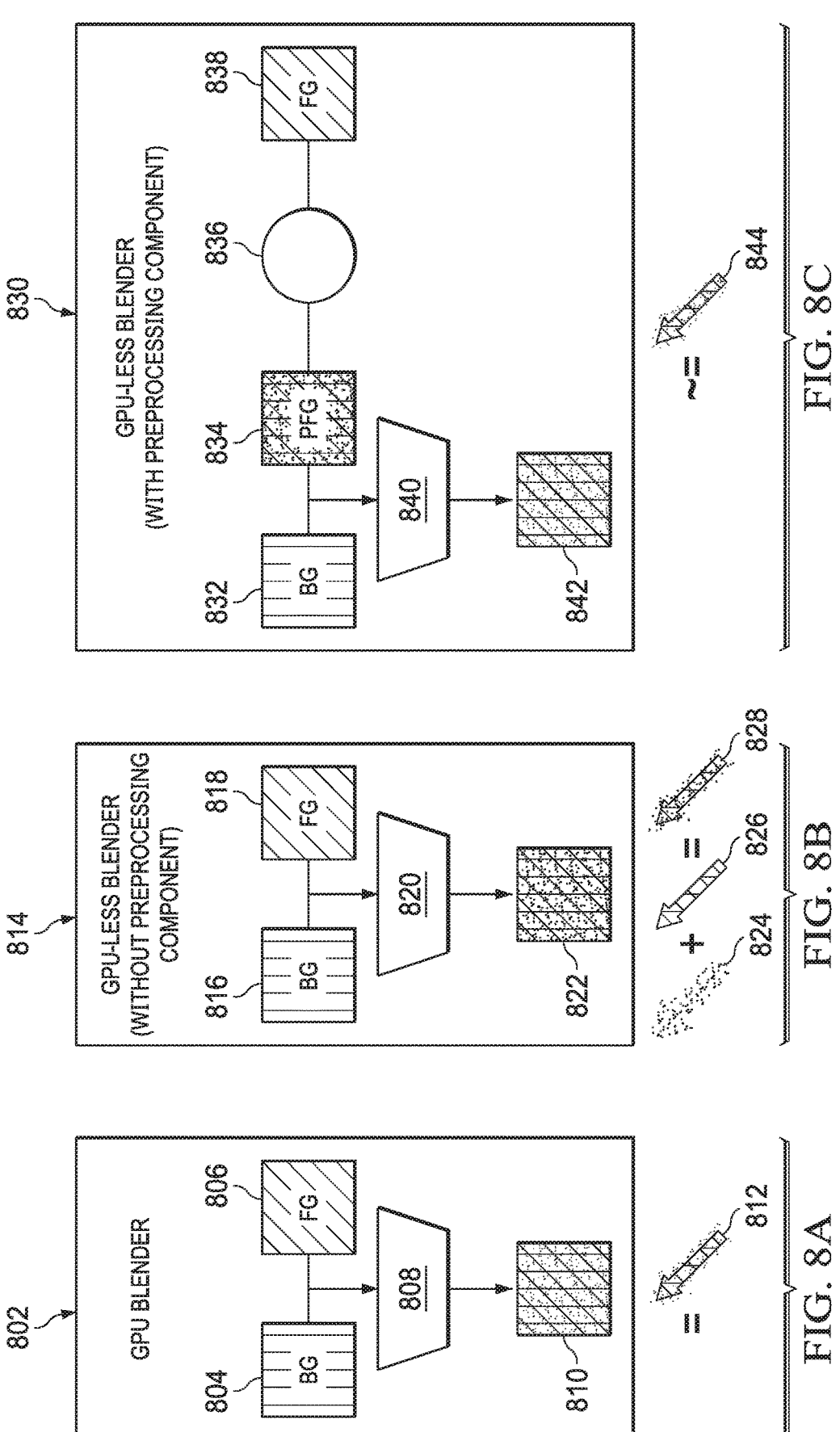
FIG. 8A depicts a blender component of a GPU cluster subsystem and a result image.
FIG. 8B depicts a blender component of a GPU-less cluster subsystem without a preprocessing component and a result image.
FIG. 8C depicts a blender component of a GPU-less cluster subsystem with a preprocessing component and a result image.

FIG. 8A depicts a blender component of a GPU cluster subsystem and a result image. FIG. 8B depicts a blender component of a GPU-less cluster subsystem without a preprocessing component and a result image. FIG. 8C depicts a blender component of a GPU-less cluster subsystem with a preprocessing component and a result image. Using a GPU blender 802 is beneficial because a GPU supports color blending and is useful for adding glow effects. Multiple layers can be blended together. An additive blender 808 can support Porter-duff blending, in which a source image 806 and a destination image 804 are additively blended, resulting in a combined image 810. The arrow 812 is an example image that has been additively blended using a GPU, and the arrow has an interesting color and has an interesting glow effect. Using a GPU-less blender without a preprocessing component 814 is the least expensive option. In this case, a raw source image 818 that has not been preprocessed is combined with a destination image 816 using an overlay blending display hardware component 820, resulting in image 822. This option is useful for compositing multiple layers, where each blend layer takes one pipeline. In this case, a glow image 824 is combined with a raw asset 826 to produce the resulting arrow image 828. The system and method disclosed herein implements a GPU-less blender with a preprocessing component 830. Raw assets 838 are extracted, preprocessed using a preprocessing component 836, resulting in a preprocessed source image 834 that can be blended with a destination image 832, using an overlay blending component 840 in the display hardware. The overlay blending component 840 can implement alpha blending, resulting in the combined image 842, or the arrow 844. In an ideal scenario, the arrow 844 has a similar look and feel as the arrow 812 that was created by the GPU blender 802.

FIG. 9 shows a comparison of the output results of different blend operations. Item 902 shows the output of a GPU-based cluster system (or subsystem). The output 902 of the GPU-based cluster system is the result of additive blending of original assets such as a Porter-duff blending. Item 904 is the result of a GPU-less cluster system (or subsystem) rendering with alpha blending of original assets that have not been preprocessed. Item 906 is the result of a GPU-less cluster system (or subsystem) rendering with alpha blending of pre-processed assets. As can be seen in FIG. 9, item 906 (with preprocessing) has a look-and-feel similar to that of item 902, while item 904 (with no preprocessing) does not look like item 902. This demonstrates the benefits of pre-processing the assets prior to performing an alpha blending. If a first system has a hardware block that can do one operation (e.g., add two numbers), and a second system has a hardware block that can do multiple operations based on a select switch (it does the selected operation), generally the cost of the second system is much higher than the first system. A GPU-less cluster system is analogous to the first system, while a GPU-based cluster system is analogous to the second system. A GPU is a programmable blender, whereas a display pipeline/hardware can have an alpha blender because it is cheap and can do one function. Therefore, at the cost of just pre-processing the assets one time, the system achieves the benefit of running them through a programmable hardware (such as one with a GPU) when the system boots.

FIG. 10 depicts an example multi-frequency update of static and dynamic layers. Prior to rendering the assets on the screen (the entire needle position is put onto the screen), the system facilitates that the assets rendered before have been removed from the screen. Also, there is an industry standard to render the assets at 60 frames per second. If the dial and needle are rendered at 60 frames per second, much of the system bandwidth (the RAM) can be consumed to the point where the bandwidth can be completely consumed and the CPU can be wasting cycles drawing a static image that is not really changing. Overall, this results in a waste of computing power. Further, the overall system can be running many more applications in addition to digital display of telltale parameters (navigation, rear seat entertainment, etc.). Thus, in order to utilize bandwidth efficiently, the disclosed examples split the rendering into two layers. To do this, the system realizes that the needles (dynamic assets) are more frequently updated, and are generally much smaller than the static assets (like a dial). Thus, the dynamic assets and the static assets are placed into separate layers. The dynamic (needle) layer is updated at 60 frames per second, while the static (dial) layer is updated at lower rate (say 10 frames per second which in practice, is more than enough). Accordingly, the static assets 1002 such as dials, gauges, and menus are rendered on a static layer at a first rate (e.g., 10 frames per second), while the dynamic assets 1004 such as needles and speed indicators are rendered on a double buffered dynamic layer at a second rate (e.g., 60 frames per second), the second rate being greater than the first rate. Item 1006 is the final rendering when combining the static assets 1002 and dynamic assets 1004, or a displayed cluster frame after alpha-blending of static and dynamic layers using display subsystem pipelines.

The DSS controls whatever is rendered onto the display. The DSS has four pipelines, or canvases. The dynamic assets are rendered onto one canvas, while the dial is rendered onto another canvas. The canvases are then merged together to form the display.

Figure 11:
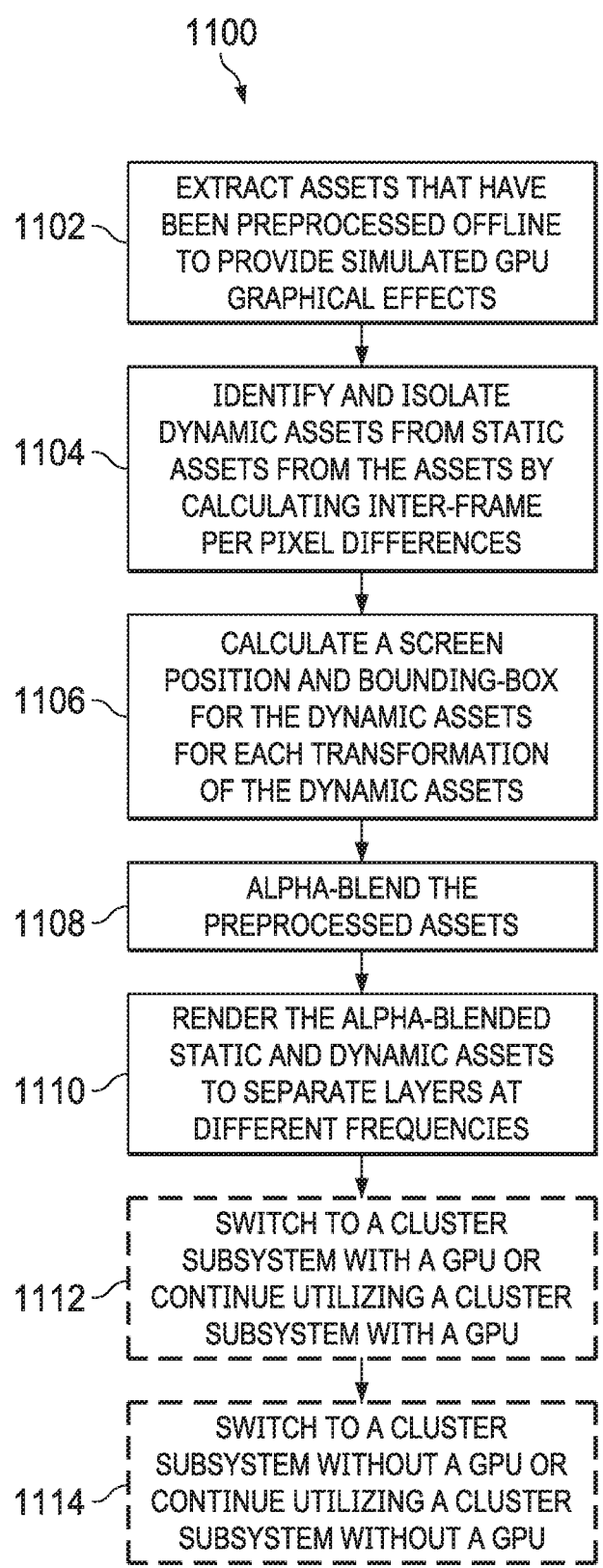
FIG. 11 is a flow diagram of an example method to simulate a cluster system that has a GPU on a GPU-less cluster system.

FIG. 11 is a flow diagram of an example method simulating effects of displaying assets as if they were rendered using a graphical processing unit (GPU) on a cluster subsystem without a GPU. At 1102, preprocessed assets are extracted. Assets are preprocessed offline to provide simulated GPU graphical effects. For example, the preprocessing of assets offline produces images similar to images that would be an output of a Porter-duff blending by altering alpha and color channels in the assets. At 1104, dynamic assets are identified and isolated from static assets by calculating inter-frame per pixel differences. At 1106, a screen position and bounding-box are calculated for the dynamic assets for each transformation of the dynamic assets. At 1108, the preprocessed assets are alpha blended. At 1110, the alpha-blended static and dynamic assets are rendered to separate layers at different frequencies. The combined assets (static and dynamic) are displayed on a display within a GPU-less cluster subsystem to simulate a GPU-based cluster subsystem. Optionally, at 1112, the method includes switching to a cluster subsystem with a GPU or continuing to utilize a cluster subsystem with a GPU when a GPU is available, and at 1114, the method includes switching to a cluster subsystem without a GPU or continuing to utilize a cluster subsystem without a GPU when the GPU is unavailable.

The proposed examples have a number of benefits, including reusing assets to provide an identical user experience on a GPU-less cluster subsystem as would be experienced by a user on a GPU-based cluster subsystem. This involves simulation of a GPU-based cluster subsystem application to save rendered buffers to a storage media, and extraction of these assets to facilitate a similar look-and-feel between cluster applications. The benefits also include preprocessing assets to simulate 3D effects, by preprocessing asset images with filters on a PC to achieve the visual effects with a display subsystem using alpha blending. The examples also provide a method of identification of dynamic assets including isolation of dynamic assets by calculating inter-frame pixel differences. The examples further provide a varying bounding box computation for needle assets such that a dynamic bounding box calculation for each transformation reduces asset size, and a multi-frequency rendering of individual layers, such that static and dynamic assets are rendered on separate buffers at different frame-rates.

The disclosed examples would manifest themselves in devices where 3D like effects are realized on GPU-less cluster system. For example, if a GPU-less cluster system implements 3D effects like depth, lighting and shadow, then it is likely that the disclosed examples have been implemented. Further, in consideration of using multiple display pipelines for cluster application, if a cluster application uses separate layers and display pipelines for static and dynamic elements, then it is likely that the disclosed examples have been implemented. Further, in a system that does not have a GPU, and if the display peripheral is not capable of performing Porter-duff blending, but is capable of alpha blending, and if the CPU load does not appear to be or is not high, it indicates that the CPU is not performing a blending operation, so it is likely that pre-processed assets are used for blending.

The disclosed examples result in many advantages, including a fully functional GPU-less cluster system running on an auxiliary core processor. Also, the disclosed examples allow for seamless switching between a GPU-less cluster subsystem and a GPU-based cluster subsystem (depending on the availability of the GPU) without a differences in user experience. The disclosed examples can be implemented on a family of system on a chips (SOCs) catering to a cluster applications.

In summary, the examples disclosed herein are applicable to many graphics applications, such as automotive, advanced driver assistance systems (ADAS), and infotainment applications. The disclosed examples provide a method and apparatus to implement 3D GPU cluster system simulation on GPU-less cluster system. The examples disclosed here implement a technology where a GPU-less cluster system provides a visual experience on par with industry standard GPU-based cluster system solutions. The disclosed examples implement a method of extracting assets from a GPU-based cluster system for reuse in GPU-less cluster system, preprocessing extracted assets to simulate 3D effects with DSS alpha-blending, calculating inter-frame per-pixel differences to isolate dynamic assets and their corresponding transformations for each set of input data, calculating a bounding-box for dynamic assets for each transformation to reduce asset size and direct memory access (DMA) operations, and rendering static and dynamic contents to separate layers at different frequencies.

What has been described above are examples of the disclosure. It is not possible to describe every conceivable combination of components or method for purposes of describing the disclosure, but many further combinations and permutations of the disclosure are possible. Accordingly, the disclosure is intended to embrace such alterations, modifications, and variations that fall within the scope of this application, including the appended claims.

What is claimed is:

1. A system comprising:
   a first subsystem comprising:
      a GPU; and
      a first central processing unit (CPU) configurable to execute a high-level operating system (HLOS);
      a second subsystem comprising a second CPU configurable to execute a real-time operating system (RTOS); and a switch coupled to the first subsystem and to the second subsystem, and the switch configurable to be coupled to a display, wherein the switch is configurable to selectively forward first data from the first subsystem or second data from the second subsystem to the display.

2. The system of claim 1, wherein the switch is configurable to forward the second data from the second subsystem to the display when the first subsystem is busy.

3. The system of claim 1, wherein the switch is configurable to forward the second data from the second subsystem to the display when it is determined that the first subsystem has crashed.

4. The system of claim 3, wherein the second data comprises frames, and wherein it is determined that the first subsystem has crashed when the first subsystem drops a plurality of frames.

5. The system of claim 4, wherein it is determined that the first subsystem has crashed when the first subsystem drops 2 frames.

6. The system of claim 1, further comprising a first communication interface, wherein the first subsystem comprises a second communication interface coupled to the first communication interface, and wherein the second subsystem comprises a third communication interface coupled to the first communication interface.

7. The system of claim 6, wherein the first, second, and third communication interfaces are controller area network (CAN) communication interfaces.

8. The system of claim 1, wherein, the switch is configurable to forward the first data from the first subsystem when the first subsystem is available.

9. The system of claim 1, further comprising:

a memory; and wherein the second CPU is configurable to extract preprocessed assets from the memory, the preprocessed assets including a dynamic asset and a static asset, wherein the second data comprises a first display layer comprising the static asset at a first frame rate, and a second display layer comprising the dynamic asset at a second frame rate different from the first frame rate.

10. The system of claim 9, wherein the second frame rate is faster than the first frame rate.

11. The system of claim 9, wherein the second CPU is further configurable to alpha-blend the static asset and the dynamic asset.

12. The system of claim 9, wherein the second CPU is further configurable to calculate a bounding-box for the dynamic asset, wherein a size of the dynamic asset is based on a size of the bounding-box.

13. The system of claim 12, wherein the size of the bounding-box changes based on each transformation of the dynamic asset.

14. The system of claim 9, wherein the dynamic asset comprises a needle.

15. The system of claim 1, wherein the first subsystem and the second subsystem are configurable to be simultaneously executed.

16. The system of claim 1, wherein a rendering of the first data in the display is substantially visually identical to a rendering of the second data in the display.

17. The system of claim 1, wherein the switch is configurable to forward the first data or the second data to the display to be rendered at 60 frames per second.

18. The system of claim 1, wherein the second subsystem is a microcontroller-based cluster subsystem.

19. The system of claim 1, wherein the second subsystem is a digital instrument cluster subsystem for rendering a digital instrument panel in the display for a vehicle.

20. The system of claim 1, further comprising a liquid crystal display (LCD) coupled to the switch.

21. The system of claim 1, wherein the second data comprises data associated with rendering of a speed of a vehicle and of revolutions per minute (RPM) of the vehicle.

22. A system comprising:

a switch;

a graphics processing unit (GPU)-based cluster subsystem comprising a GPU and a first central processing unit (CPU) configurable to execute a high-level operating system (HLOS), and a first display controller configured to provide first data to the switch; and a GPU-less cluster subsystem comprising a second display controller configured to provide second data to the switch, the GPU-less cluster subsystem further comprising a second CPU configurable to execute a real time operating system (RTOS), wherein the switch is configured to selectively forward the first data from the first display controller or the second data from the second display controller, wherein the switch comprises a quality of service (QoS) switch controlled by monitor software, wherein the first data comprises frames, and wherein the QoS switch is configured to forward the second data in response to a determination by the QoS switch that the GPU-based cluster subsystem has dropped two or more frames.

23. A system comprising:

a memory;

a processor configurable to:

extract preprocessed assets from the memory, the preprocessed assets including a dynamic asset and a static asset, the dynamic asset corresponding to a three dimensional model of a first object and the static asset corresponding to a three dimensional model of a second object, wherein the preprocessed assets have been preprocessed offline to provide simulated GPU graphical effects based at least in part on altered alpha and color channels and alpha-blending to simulate Porter-Duff blending;

isolate the dynamic asset from the static asset based at least in part on calculation of inter-frame per-pixel differences between successive frames on a region-of-interest to identify each transformation of the dynamic asset; and calculate a bounding-box for the dynamic asset, wherein a size of the dynamic asset is based on a size of the bounding-box, wherein the size of the bounding-box changes based on each transformation of the dynamic asset, and wherein a reduced asset size enables direct memory access (DMA) operations for rendering assets with sparse content; and a display controller configurable to render the static asset at a first frame rate, and the dynamic asset at a second frame rate that is faster than the first frame rate, wherein the display controller is configurable to alpha-blend the static asset and the dynamic asset, wherein the static asset is copied to a first layer updated at the first frame rate, and the dynamic asset is copied to a second layer that is double-buffered and updated each frame, and wherein the first layer and the second layer are displayed via different display subsystem (DSS) pipelines.

24. The system of claim 23, wherein the processor is a central processing unit (CPU) configurable to run a real time operating system (RTOS), wherein the CPU comprises an auxiliary core processor configured to run at a reduced clock rate, and wherein the system is configurable to be simultaneously executed with a GPU-based cluster subsystem comprising a GPU and a main CPU configurable to execute a high-level operating system (HLOS).

* * * * *